H. P. WESTCOTT.
Churn.
No. 47,145.
Patented April 4, 1865.
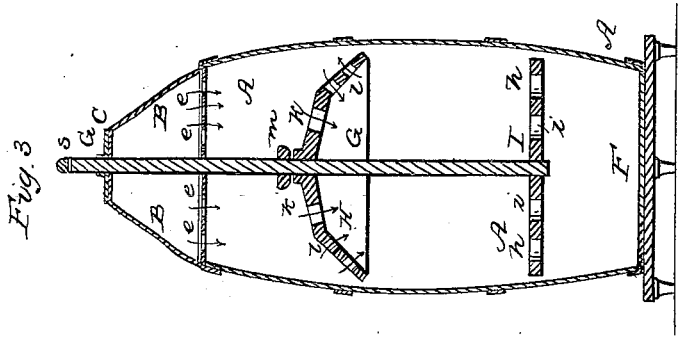
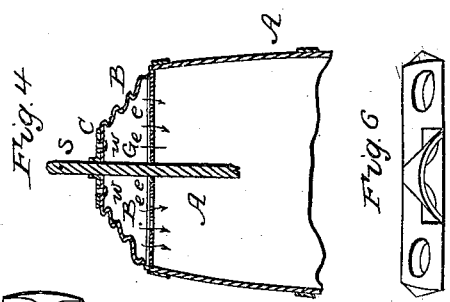
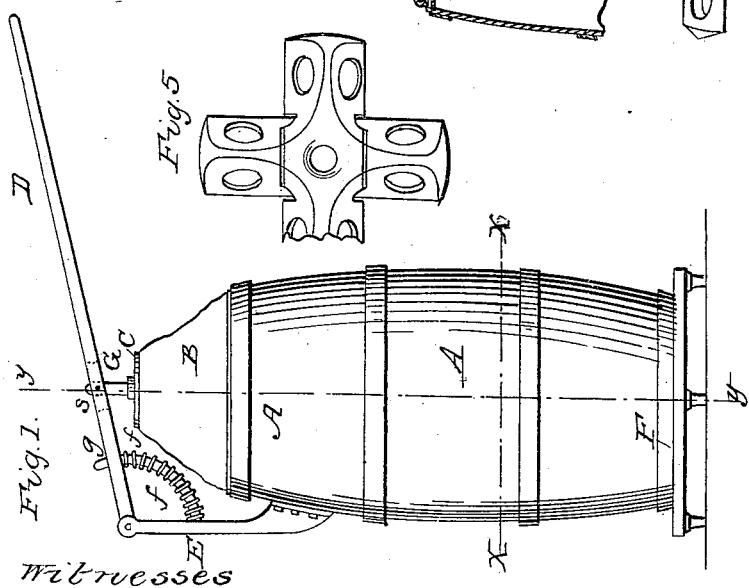
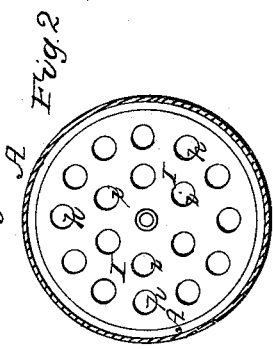

UNITED STATES PATENT OFFICE.

HENRY P. WESTCOTT, OF SENECA FALLS, NEW YORK.

IMPROVEMENT IN CHURNS.

Specification forming part of Letters Patent No. 47,145, dated April 4, 1865.

*To all whom it may concern:*

Be it known that I, HENRY P. WESTCOTT, of Seneca Falls, of the county of Seneca, in the State of New York, have invented certain new and useful Improvements in Churns; and I do hereby declare that the following is a full and exact description thereof, reference being had to the accompanying drawings, making part of this application.

My present invention relates to that class of churns involving the use of a receiver or cream-chamber, and a vertically reciprocatory dasher-shaft.

My invention consists, first, in the employment of a bellows or flower arranged on top of the cream-chamber, and operated by the dasher-shaft in such manner as to cause a blast of air to penetrate numerous holes in the top of the cream-chamber, and enter into the mass of cream while agitated by the dashers, all as hereinafter more fully set forth.

And my invention consists, secondly, in a novel arrangement for assisting the operation of the dasher hand-lever, consisting of a spiral spring arranged on an arc in such manner as to exert a constant tendency to vibrate the hand-lever upward when the latter is depressed, as will be hereinafter fully described.

And my invention consists, thirdly, in making the dasher adjustable on its shaft, whereby I am enabled to set the dasher so that its path of motion will be near the surface of the cream, no matter whether a greater or less quantity of the latter be in the receiver, as will be presently more fully set forth.

And my invention consists, fourthly, in a peculiar form of dasher, as hereinafter more fully set forth.

To enable those skilled in the art to make and use my invention, I will proceed to describe the construction and operation of one of my improved churns, referring by letters to the accompanying drawings, forming part of this application, and in which—

Figure 1 is a side elevation of one of my improved churns. Fig. 2 is a cross-section at X X, Fig. 1. Fig. 3 is a vertical section at the line Y Y, Fig. 1. Fig. 4 is a partial vertical section showing the bellows in a depressed condition, and Figs. 5 and 6 are views of a dasher detached.

In the several figures the same part will be found indicated by the same letter of reference.

A is the receiver or body of the churn, into which the cream to be churned is put, and which I have shown as being made about in the form of a small barrel or cask, and mounted on a suitable base, F, furnished with small feet. On one side of the receiver or body A is bolted or otherwise properly secured near its top edge a stand or arm, E, in the extreme top end of which is pivoted one end of the working lever D. This lever is pivoted at $s$ to the upper end of the dasher-shaft G, as clearly shown, and extends from thence a distance sufficient to effect the easy and convenient reciprocation of the dasher-shaft by the vibration of the long end of said lever D. From the arm or stand E there extends an ark, $g$, (see Fig. 1,) which passes through a slot in the lever D, and around which the latter works up and down freely. On this arc $g$ is arranged a spiral spring, $f$, confined longitudinally between the under side of lever D and the stand E.

It will be seen now that if the lever D be depressed or vibrated downward (around its fulcrum in the end of arm E) the spring $f$ will be necessarily compressed, which will cause it to exert a pressure or tendancy to return the said lever D to its former elevated position, as seen at Fig. 1.

I is the lower dasher, which I have shown in the form of a plain disk, perforated with numerous holes, and which is secured to the lower end of the shaft G. This shaft, which works up and down through a suitable bearing in the top of the receiver A, has a screw thread cut during a portion of its length to accommodate the female screw of the adjustable dasher H and that of the jam-nut $m$. (See Fig. 3.)

The peculiar form of the dasher H will be be clearly seen at Fig. 3, where it will be observed that said dasher H is convex on its top and hollowed out or concave on its lower surfaces, and that its surfaces are composed of two surfaces, forming an angle with each other, and that each of these surfaces is penetrated or perforated by holes of different diameters, $t$ and $k$, through which the cream is forced, as indicated by arrows, Fig. 3, during the operation of the churn, as will be presently explained.

B is a bellows formed of leather, cloth, or other suitable material. The top of the receiver A constitutes one base of this bellows, and the circular disk or plate C, which is fastened to the shaft G, the other base. In this latter are suitable valves, w w, (see Fig. 4,) for the ingress of the air, which is forced out through the apertures e e e in the top of the receiver A, as indicated by the arrows, Figs. 3 and 4. At Fig. 3 this bellows B is shown distended or filled with air, (the lever D being elevated or at the extreme of its upward vibration,) while at Fig. 4 said bellows is shown as depressed or discharging its blast through the holes e e down into the interior of the receiver A.

At Figs. 5 and 6 I have shown in top view and side elevation a peculiar form of upper dash, which may be employed with much advantage on account of its tendency to agitate the cream very greatly, and its economic construction, compared with the form shown in the other figures.

The operation of my improved churn may be thus briefly explained: The receiver A being supplied with the cream to be churned, the adjustable dasher H is first set to such an elevation or position to the shaft G (and there fastened by the jam-nut m) as will cause the said dasher H to lie in the plane of the top or surface of the cream when said dasher is at the middle of its stroke—that is to say, the dasher H is set at such a height relative to the top surface of the cream that it will ascend about as far out of the mass of cream as it will descend into it. The reciprocation or up-and-down motion of the shaft G is then effected by moving the long arm of the lever D up and down (by hand or in any other manner.) At each downstroke of the shaft G the spring f is compressed, and its strength or spring force, made to assist the following upstroke of the said shaft, and its lever D. As the shaft G moves up and down in the receiver A, the dashers H and I work, one near the top of the mass of cream, and the other near its bottom, the cream being forced (at each stroke of said dashers) through their openings or holes h i and t k, and thus greatly agitated. During the downstroke of the dashers, and while the cream is being forced upward in numerous jets through the holes t k, the bellows B is causing numerous jets of air to descend through the apertures e e e and commingle thoroughly with the mass of cream, whereby the extraction of the particles is greatly facilitated. It will be observed that the holes t are bored at right angles to the surface of dasher H, through which they pass, while the holes k are bored at right angles to the surface through which they pass, and that the lines of directions of these two sets of holes is such as to converge at one point in the line of the shaft G. The objects of having the holes t k thus formed, are to induce to the forcing outward constantly of the cream toward the sides of the receiver, or away from the center of the mass of cream, and also to induce to a divergence of the jets of cream, to enable the currents of air from the bellows to more thoroughly intermingle with the cream.

It will be seen that the peculiar form of the dasher H is such as to assist in this operation on the cream by its tendency in its downward stroke to force the cream away from the shaft G, and out toward the perimeter of the dasher, as it escapes through the smaller holes, t, and it will also be seen that by making the dasher H of the form shown, and having the holes k larger than those at t, the tendency of said dasher during its upward stroke is to create a vacuum around the shaft G and near the body A of the churn.

Experiment has shown that the most desirable point to work the dasher is through (or near) the surface of the cream, and by making the dasher adjustable, as described, it will be seen that this desideratum may be successfully attained with various quantities of cream in the churn.

Having fully explained my improved churn, what I claim therein as new, and desire to secure by Letters Patent, is—

1. The employment, in combination with the arm E, lever D, and arc g, of a spring, f, substantially as and for the purpose set forth.

2. The use of a bellows B, or its equivalent, in combination with the receiver and dasher-shaft, in the manner and for the purpose substantially as set forth.

3. Making the dasher adjustable, substantially as and for the purpose set forth.

4. The peculiar form of upper dash shown and described, for the specific purposes set forth.

In testimony whereof I have hereunto set my hand and seal this 22d day of June, 1864.

HENRY P. WESTCOTT. [L. S.]

Witnesses:
JNO. F. PORTER,
SIMEON HOLTON.